I. N. FORRESTER.
Child's Carriage.
No. 110,561. Patented Dec. 27, 1870.
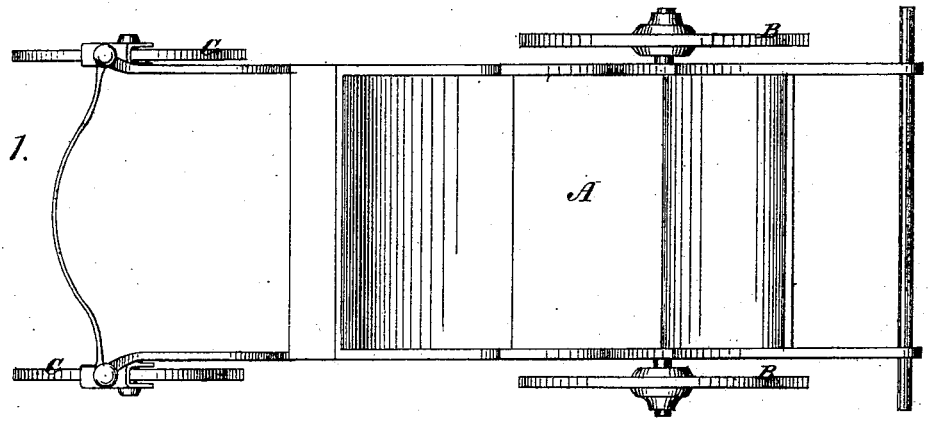
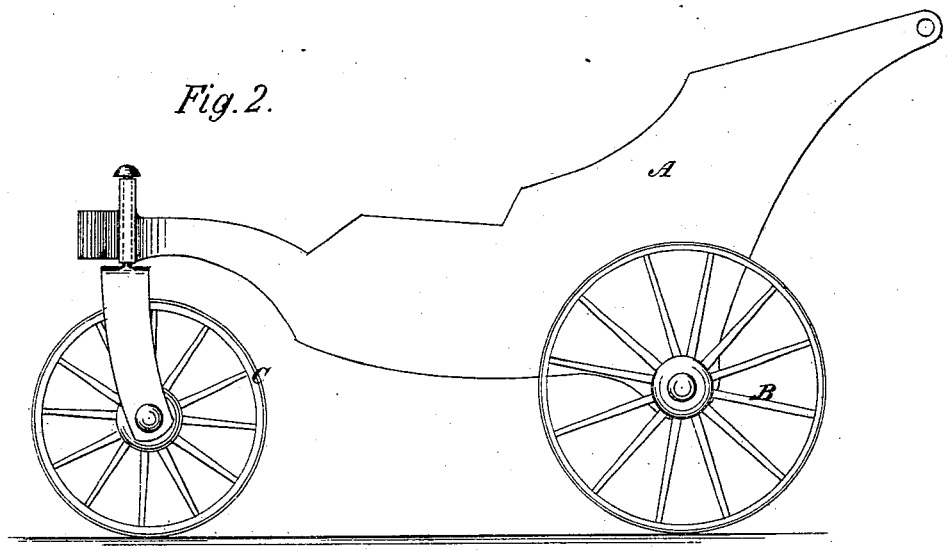
Witnesses:
Inventor:

United States Patent Office.

ISAAC NEWTON FORRESTER, OF BRIDGEPORT, CONNECTICUT.

Letters Patent No. 110,561, dated December 27, 1870.

IMPROVEMENT IN CHILDREN'S CARRIAGES.

The Schedule referred to in these Letters Patent and making part of the same.

*To all whom it may concern:*

Be it known that I, ISAAC NEWTON FORRESTER, of Bridgeport, in the county of Fairfield and State of Connecticut, have invented a new and useful Improvement in Children's Carriages, of which the following is a specification.

My invention relates to children's carriages of that class which is propelled from behind.

Its object is to render the carriage steady and prevent liability to upset, while leaving it free to turn readily; to which end, My invention consists in combining a carriage-body with hind wheels mounted on a fixed axle and with two front leading caster-wheels so pivoted to the body or frame of the carriage, independently of each other, as freely to turn in any direction, as hereinafter more fully set forth.

In the accompanying drawing—

Figure 1 is a plan, and

Figure 2, a side elevation of my improved carriage.

The body A of the carriage is mounted on two hind wheels B, turning on a fixed axle in the usual way.

The front end of the body is supported by two caster-wheels C C, each independently, and freely turning in bearings in the frame.

As the carriage is pushed from behind the attendant can readily turn it either to the right or left, the front wheels easily conforming to any lateral pressure exerted on the carriage, which can thus be steered as easily as the old-fashioned ones having one leading wheel, and, at the same time, is much less liable to upset.

I am aware that the use of caster-wheels is common in articles of furniture and in various classes of machinery, such as harvesters and velocipedes, their combination and application, however, being different from those shown by me. I do not, therefore, broadly, claim the combination of a caster-wheel with a child's carriage.

I am not aware, however, of the combination with a carriage of two main wheels, revolving on the same axle, with two leading wheels in front thereof, revolving independently of each other on their spindles, as shown by me.

Having thus described my improved carriage,

What I claim therein as new, and desire to secure by Letters Patent, is—

The combination of the carriage-body, the pushing-handle, the fixed axle in rear of the body, the hind wheels mounted on said axle, and the leading casters mounted and turning freely and independently of each other on spindles turning in the front part of the frame, all these parts being constructed and operating as hereinbefore set forth.

I testimony whereof I have hereunto subscribed my name.

ISAAC NEWTON FORRESTER.

Witnesses:
HENRY E. BOWSER,
S. C. NICKLESON.